United States Patent
Burek et al.

(10) Patent No.: US 10,139,582 B2
(45) Date of Patent: Nov. 27, 2018

(54) FIBER OPTIC STORAGE MODULE INSTALLATION AT USER PREMISES

(71) Applicant: OFS Fitel, LLC, Norcross, GA (US)

(72) Inventors: Denis E Burek, Cumming, GA (US); Willard C White, Suwanee, GA (US); Xavier Chiron, Atlanta, GA (US)

(73) Assignee: OFS FITEL, LLC, Norcross, GA (US)

( * ) Notice: Subject to any disclaimer, the term of this patent is extended or adjusted under 35 U.S.C. 154(b) by 0 days.

(21) Appl. No.: 15/712,754

(22) Filed: Sep. 22, 2017

(65) Prior Publication Data

US 2018/0239101 A1 Aug. 23, 2018

Related U.S. Application Data

(60) Provisional application No. 62/462,453, filed on Feb. 23, 2017.

(51) Int. Cl.
*G02B 6/44* (2006.01)
*G02B 6/38* (2006.01)

(52) U.S. Cl.
CPC ......... *G02B 6/4457* (2013.01); *G02B 6/3897* (2013.01); *G02B 6/4441* (2013.01); *B65H 2701/00* (2013.01); *G02B 6/4452* (2013.01); *G02B 6/4466* (2013.01)

(58) Field of Classification Search
CPC .... G02B 6/3825; G02B 6/3897; G02B 6/444; G02B 6/4452; G02B 6/4455; G02B 6/4457; G02B 6/4466; G02B 6/46; B65H 2701/00
USPC ................................ 385/134–139; 242/598.6
See application file for complete search history.

(56) References Cited

U.S. PATENT DOCUMENTS

| | | | |
|---|---|---|---|
| 5,971,316 A | 10/1999 | Kim | |
| 6,529,663 B1 | 3/2003 | Parris et al. | |
| 7,280,725 B2 | 10/2007 | Brown et al. | |
| 7,512,308 B2 | 3/2009 | Barnes et al. | |
| 8,818,157 B2 | 8/2014 | Burek et al. | |
| 9,429,729 B2 | 8/2016 | Burek et al. | |
| 9,535,227 B2 | 1/2017 | Kowalczyk et al. | |
| 9,904,026 B2 * | 2/2018 | Burek ................. | G02B 6/4441 |
| 2004/0033015 A1 | 2/2004 | Andersen et al. | |

OTHER PUBLICATIONS iPHOTONIX, "8201 Indoor Dual Mode Single Port ONT," Overview and Specifications (Jul. 29, 2013).

* cited by examiner

*Primary Examiner* — Michael Mooney
(74) *Attorney, Agent, or Firm* — Law Office of Leo Zucker, Esq.

(57) ABSTRACT

An optical fiber storage module has a base, and a wall having an opening for paying out an optical fiber from inside the module. Spool retention fingers extend from the base. One or more fingers have a first rim at a first height above the base, and one or more fingers have a second rim at a second height above the base. A fiber supply spool has a hub, and an annular support disk inside the hub which forms a third rim. The spool is movable on the retention fingers between a first position where the third rim of the support disk is captured between the first and the second rims on the retention fingers, thus allowing the spool to turn when fiber is unwound, and (b) a second position where the spool engages one or more bosses formed on the module base to lock the spool from further rotation.

20 Claims, 5 Drawing Sheets

FIBER OPTIC STORAGE MODULE INSTALLATION AT USER PREMISES

CROSS REFERENCE TO RELATED APPLICATION

This application claims priority under 35 U.S.C. □119(e) of U.S. Provisional Patent Application No. 62/462,453 filed Feb. 23, 2017, and titled □No-Adapter Module and Spool,□ the entire contents of which are incorporated by reference.

BACKGROUND OF THE INVENTION

Field of the Invention

The present invention relates to modules for containing and storing optical fibers that are routed at the premises of fiber optic network users.

Discussion of the Known Art

During a typical fiber-to-the-home (FTTH) installation at the premises of a fiber optic network user, a drop fiber is routed over a path that is out of the ordinary field of view of the premises occupants. For example, the fiber may be stapled or bonded with an adhesive to a crown molding or a baseboard over the routing path. The path extends between an entry point at the premises where a provider network terminal is located for connection to one end of the drop fiber (hereafter □the entry point□), and a wall-mounted module behind a desk or television inside the premises wherein any excess or □slack□ length of the drop fiber is stored on a spool inside the module.

A free end of the drop fiber in the storage module is terminated in a connector, and the connector is mated to one side of an adapter inside the module. The other side of the adapter is exposed outside the module, and one end of a short fiber jumper cable is connected to the exposed side of the adapter. The other end of the jumper cable is connected to an optical network terminal (ONT) at the premises. See, e.g., U.S. Pat. No. 9,429,720 (Aug. 30, 2016) and U.S. Pat. No. 8,818,157 (Aug. 26, 2014), both of which are incorporated by reference.

The ONT operates to convert downlink optical signals sent from the network terminal through the drop fiber and the fiber jumper cable, into corresponding electrical signals that are produced at an output of the ONT. A wire cable is connected at one end to the ONT output, and at the other end to, e.g. the television and/or a router that is configured to link other electronic devices at the premises with the fiber optic network. The ONT also converts electrical signals originating from the devices at the premises into corresponding uplink optical signals that are sent to the network terminal through the jumper cable and the drop fiber.

Although the typical FTTH installation described above operates well and is widely deployed, there is a need and a desire for a configuration that uses fewer components, so that the overall cost of the installation to both the user and the network provider in terms of time and materials, is reduced.

SUMMARY OF THE INVENTION

According to the invention, an optical fiber storage module has a body including a base, and a wall extending upward from the base and having one or more openings for paying out a length of an optical fiber from inside the module. A number of bosses are formed on the base, and a number of retention fingers extend upward from the base. At least one of the fingers has a first rim at a first height above the base, and at least one of the fingers has a second rim at a second height greater than the first height above the base.

A fiber supply spool includes a cylindrical hub, an annular support disk fixed to an inner circumference of the hub, and a collar arranged to receive the retention fingers on the module base and mount the supply spool on the retention fingers. The collar is fixed to the support disk inside the hub, and the inner circumference of the support disk forms a third rim.

The fiber supply spool is movable axially over the retention fingers between (a) a first position where the third rim on the inner circumference of the support disk inside the hub is captured between the first rim on one of the retention fingers and the second rim on one of the retention fingers, so that the spool can rotate freely about the fingers when a fiber is unwound from the spool hub and payed out through an opening in the wall of the module body, and (b) a second position where a lower portion of the spool engages the bosses on the base of the module body so that the spool is locked from rotation about the fingers.

For a better understanding of the invention, reference is made to the following description taken in conjunction with the accompanying drawing and the appended claims.

BRIEF DESCRIPTION OF THE DRAWING FIGURES

DETAILED DESCRIPTION OF THE INVENTION

As used herein, the terms □user□ and □customer□ are used inter-changeably to mean a natural person or a legal entity that uses telecommunication services offered by a fiber optic network provider. Such services may include, for example, Internet access, telephony, television, voice and music broadcasts, or other information and data streams that require the installation of one or more optical fibers at the location where the services are to be used by the person or entity (e.g., a private home, apartment, store, or office). Further, the words □premises,□ □home,□ and □residence□ are used interchangeably to refer to the location where the services of the network provider are used by the person or entity.

Figure 1:
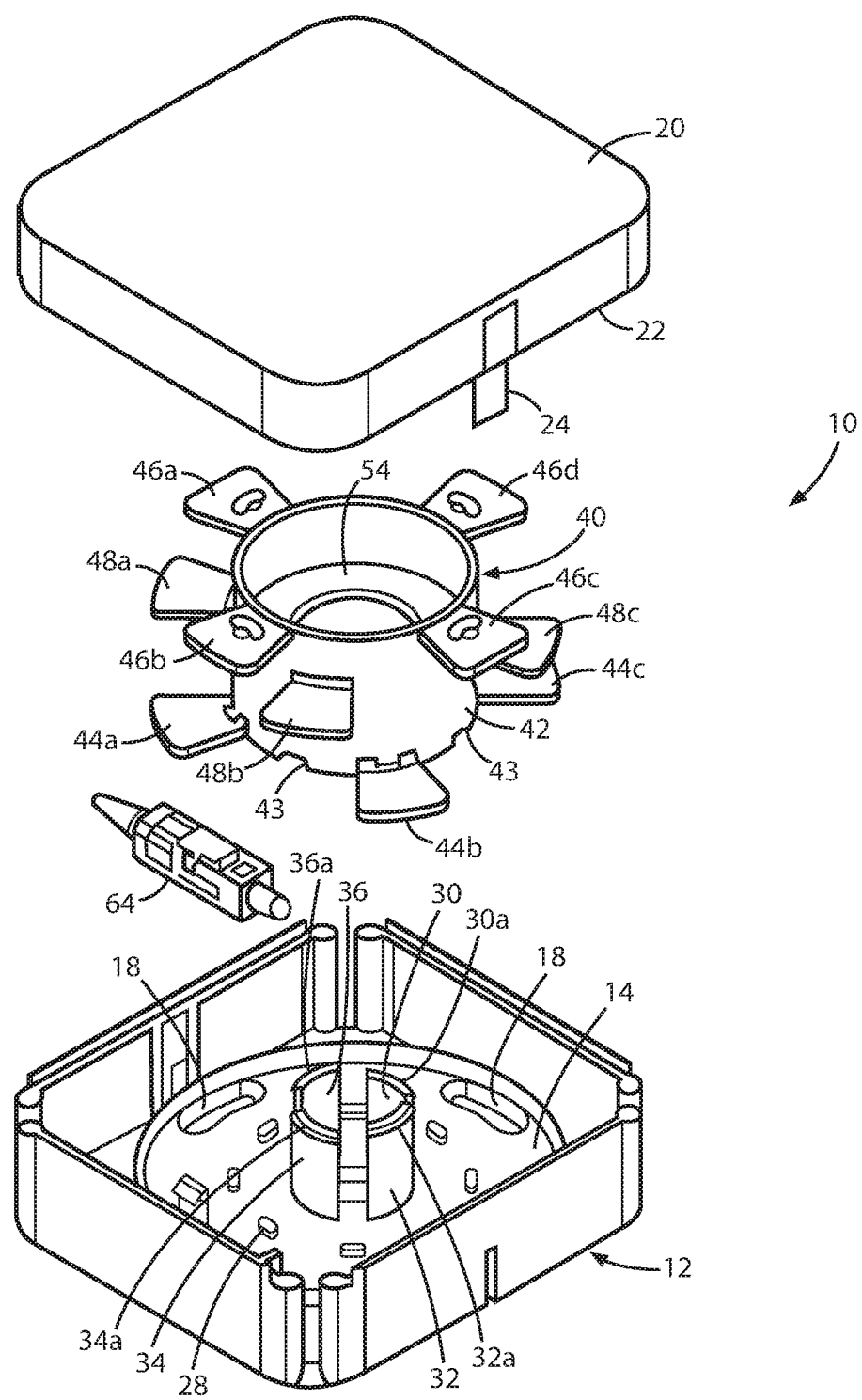
FIG. 1 is an exploded, isometric view of an optical fiber storage module according to a first embodiment of the invention.

FIG. 1 is an exploded view showing parts of an optical fiber storage module 10 according to a first embodiment of the invention. The parts are made from, e.g., polypropylene copolymer or an equivalent sturdy material that meets all applicable fire and smoke safety codes at the premises.

Figure 2:
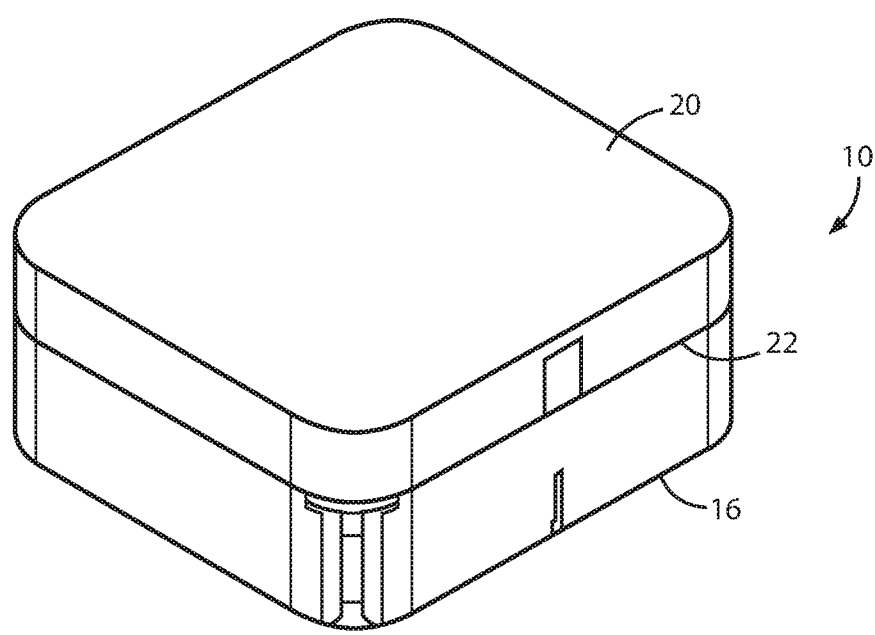
FIG. 2 is an isometric view of the module in FIG. 1 in a closed state.

When closed as shown in FIG. 2, the module 10 is of generally rectangular solid shape and measures, for example, 3.45 inches high, 3.13 inches wide, and 1.44 inches deep. The module 10 is dimensioned and configured so it can be mounted inconspicuously on a wall inside the premises.

Figure 3:
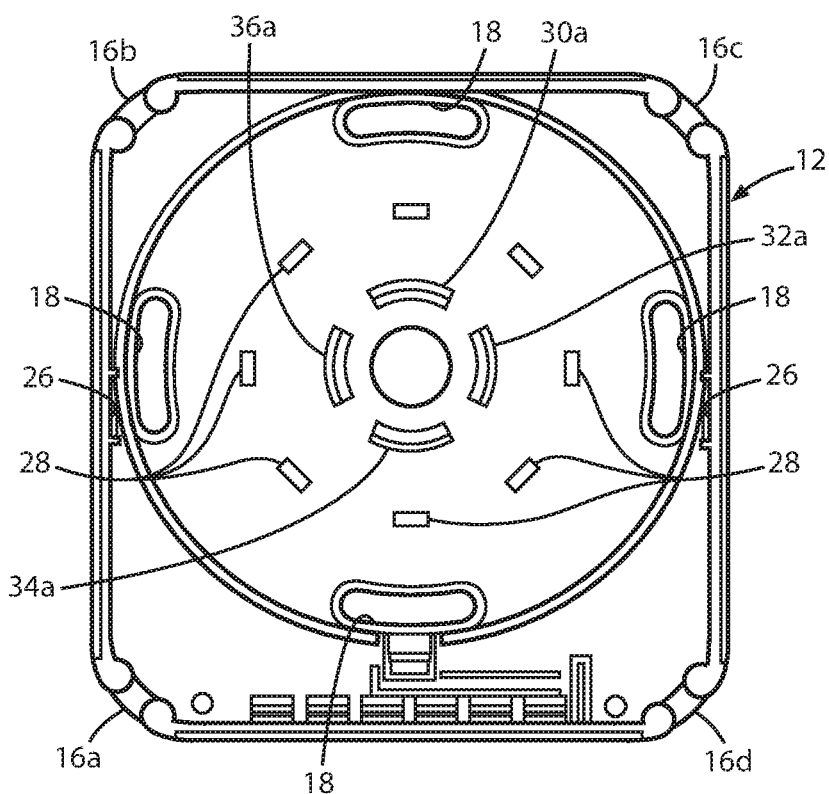
FIG. 3 is a plan view of the body of the module in FIG. 1, showing the top of a module base and a surrounding wall.
Figure 4:
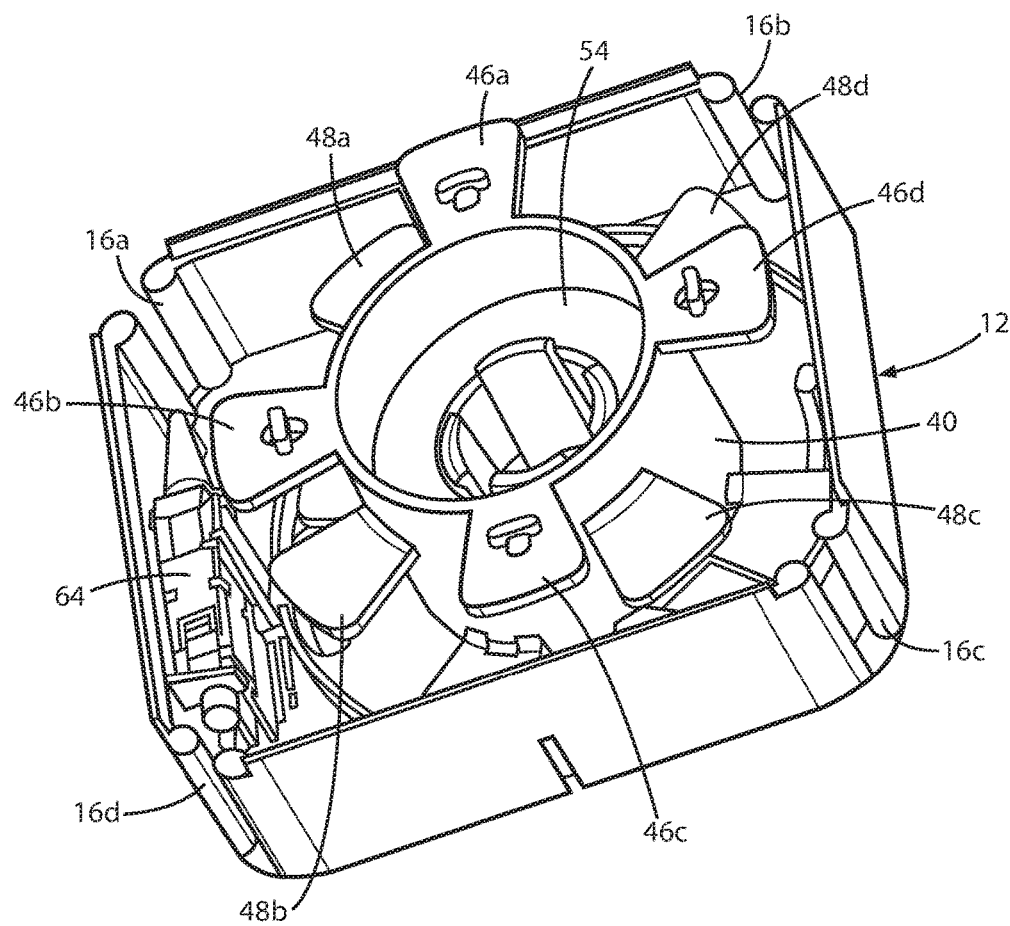
FIG. 4 is an isometric view of the interior of the module in FIG. 1 in an assembled state.

Module 10 has a body 12 which is also shown in FIGS. 3 and 4. The body 12 includes a base 14 and a wall 16 that extends upward from the perimeter of the base. The base 14 has several openings 18 to accommodate fasteners for mounting the module 10 on the wall or other supporting surface at the premises. The module 10 also includes a cover 20 having a bottom edge 22 that is dimensioned and formed to align flush with the top edge of the module wall 16 when the cover 20 is at a closed position on the module body 12 as in FIG. 2. In the illustrated embodiment, the cover 20 has a pair of resilient locking tabs 24 (one of which is shown in FIG. 1) that extend downward from opposite sides of the cover. The tabs 24 are dimensioned and formed to latch onto abutments 26 on the inside surface of the module wall 16 when the cover 20 is urged to the closed position in FIG. 2. The cover 20 can then be removed by depressing the sides of the cover from which the tabs 24 extend, so as to disengage the tabs 24 from the abutments 26.

As seen in FIGS. 1, 3, and 4, eight protuberances or bosses 28 project upward from a central portion of the module base 14, each to a height of, e.g., 0.060 inch (1.52 mm). The bosses 28 are disposed in a circular array having a diameter of, e.g., 1.650 inches (41.91 mm) and are equi-circumferentially spaced from one another. Further, a set of four elongated spool retention fingers 30, 32, 34, 36 also extend upward from the central portion of the base 14. The retention fingers 30-36 are disposed in a circular array having a diameter of 0.660 inch (16.76 mm) that is coaxial with the circular array of bosses 28. The fingers 30-36 are equi-circumferentially spaced, and the width of each finger spans 60 degrees so that facing side edges of adjacent fingers are 30 degrees apart.

A first pair of the retention fingers 30 and 34 which face one another (i.e., their long axes are 180 degrees apart), extend to a height of 0.625 inch (15.88 mm) above the module base 14. A second pair of the retention fingers 32 and 36 which also face one another extend to a slightly greater height of 0.695 inch (17.67 mm) above the base 14. Each of the four retention fingers 30-36 has a corresponding rim 30a-36a that projects radially outward from the top end of the finger. As explained below, when a fiber supply spool 40 is lowered onto the retention fingers 30-36, the rims 30a, 34a atop the first pair of retention fingers 30 and 34 together with the rims 32a, 36a atop the second pair of retention fingers 32 and 36, serve to retain the spool at an elevated position above the module base 14 where the spool 40 can turn freely about the fingers 30-36 over the base.

Figure 5:
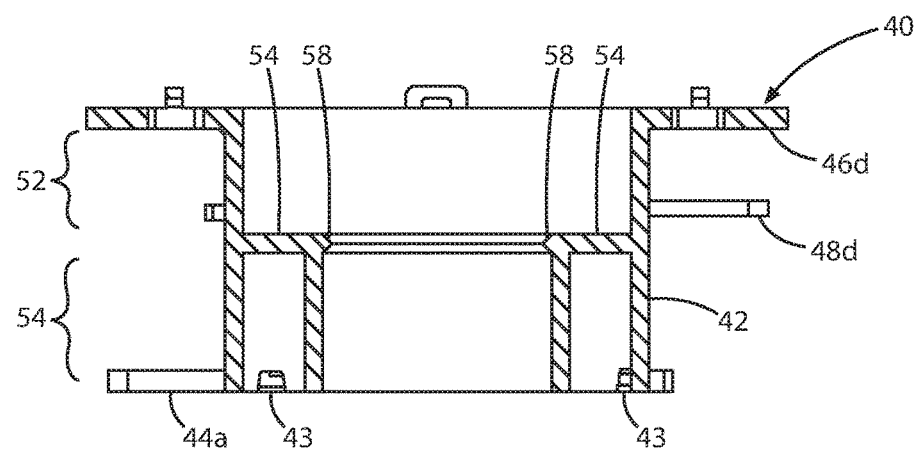
FIG. 5 is a cross-sectional view of a fiber supply spool in the module of FIG. 1.

The fiber supply spool 40 is shown in isometric views in FIGS. 1 and 4, and in cross-section in FIG. 5. Spool 40 has a cylindrical hub 42 measuring about 1.12 inches (28.45 mm) in axial height, and 1.650 inches (41.91 mm) in diameter. The spool hub 42 also has eight recesses or cutouts 43 formed along the bottom edge of the hub wall. The eight cutouts 43 are equi-angularly spaced from one another and are dimensioned to receive and engage with the eight bosses 28 on the module base 14 when the spool 40 is lowered on the retention fingers 30-36 from the elevated position to a locked position.

A first set of four flat fiber retaining ears 44a to 44d extend radially outward in equi-angularly spaced relation from the bottom of the hub 42, and a second set of four flat fiber retaining ears 46a to 46d extend radially outward in equi-angular relation from the top of the hub 42. In the first embodiment of the invention, the fiber supply spool 40 also has a third set of four flat fiber retaining ears 48a to 48d that extend radially outward in equi-angular relation from the wall of the hub 42, and at an axial distance of about 0.300 inch (7.62 mm) from the top of the hub. The first and the third sets of retaining ears 44a-44d and 48a-48d form a first winding section 50 on a lower portion of the spool hub 42, and the second and the third sets of retaining ears 46a-46d and 48a-48d define a second winding section 52 on an upper portion of the hub 42. All of the fiber retaining ears extend radially about 1.375 inches from the axis of the hub 42.

The spool 40 also contains an annular flat support disk 54, the outer circumference of which is joined coaxially to the inner circumference of the spool hub 42, and at a distance of about 0.586 inch (14.88 mm) from the bottom of the hub. A cylindrical collar 56 is joined at its upper circumference to the inner circumference of the support disk 54, and a rim 58 is formed to project radially inward from the inner circumference of the support disk 54. The lower circumference of the collar 56 is commensurate with the bottom of the hub 42.

Prior to routing, a first portion of a continuous length of a buffered optical fiber is wound in the first winding section 50 of the spool hub 42, and a second portion of the fiber is wound in the second winding section 52 of the spool hub 42. The first portion of the fiber may consist of a length of unjacketed 900 μm O.D. buffered fiber to be routed between the module 10 when mounted at the premises, and the entry point at the premises. The second portion of the fiber has jacketing over the fiber to provide a protective layer having an O.D. of, e.g., 2.0 or 3.0 mm, wherein the length of the second portion is sufficient to extend between the mounted module 10 and the ONT or other optical device inside the premises to which the fiber will connect.

The jacketing on the second portion of the fiber provides added protection when the fiber is left unsupported and while being handled. The jacketing may also include a strength member like an aramid yarn. The two fiber portions may be formed, for example, by stripping a length of jacketing from a 2.0 mm O.D. jacketed fiber to expose a corresponding length of 900 μm buffered fiber, or by upjacketing a length of 900 buffered fiber with a 2.0 mm O.D. jacket to obtain a corresponding length of 2.0 mm O.D. jacketed fiber.

After desired lengths of the first and the second fiber portions are wound in the corresponding winding sections 50, 52 on the spool hub 42, the lower circumference of the hub collar 56 is centered over the spool retention fingers 30-36 and urged toward the module base 14. When the rim 58 on the annular support disk 54 inside the spool hub 42 is urged past the projecting rims 32a, 36a on the second (or higher) pair of retention fingers 32, 36, the projecting rims 30a, 34a on the first (or lower) pair of retention fingers 30, 34 extend beneath the rim 58 of the support disk 54 and thus act to capture the spool 40 from further downward movement. As a result, the bottom of the spool 40 is held at a sufficiently elevated position over the module base 14 so that the cutouts 43 in the bottom of the spool hub 42 cannot become engaged with the bosses 28 on the base 14, and the spool is able to rotate freely about the four retention fingers 30-36.

Next, the installer unwinds the first portion of fiber from the first winding section 50 of the spool by pulling the fiber through one of four fiber payout openings 16a to 16d that are formed at the corners of the module wall 16, until a length of fiber sufficient to route and connect to the entry point of the premises is obtained. As mentioned, the spool 40 turns freely on the retention fingers 30-36 above the module base 14 as the fiber is unwound. The side edges of the fiber payout openings 16a-d are also sufficiently rounded to avoid bending the fiber below a critical bend radius while the fiber is paid out.

The module 10 may also have a number of arcuate containment walls (not shown) that extend upward from the module base 14 to face the outer periphery of the spool 40 when the spool is mounted on the retention fingers 30-36. The containment walls may serve to ensure that fiber wound or stored on the spool 40 stays within the confines of the spool at all times. Side edges of the containment walls that might contact the fiber when payed out should also be properly rounded to avoid damaging the fiber.

Once the first portion of the fiber is connected to the entry point, the fiber is adhered, stapled, or otherwise bonded along a wall or other surface inside the premises in a manner having little if any adverse visual impact, preferably working from the point of entry to the mounted module 10. Fiber that remains in the first winding section 50 on the spool 40, or any excess fiber that was unwound, is stored in the first winding section 50 on the spool.

The spool 40 is then locked against further rotation on the retention fingers 30-36 by urging the spool toward the module base 14 so that the rim 58 on the support disk 54 inside the spool hub 42 is forced past the rims 30a, 34a of the retention fingers that project beneath the disk 54, and the bosses 28 on the module base 14 are allowed to enter the cutouts 43 in the bottom of the spool hub. When the spool 40 is so locked, the rims 30a, 34a of the retention fingers project above the rim 58 on the support disk 54, so that the spool 40 is restrained from upward movement and disengaging from the fixed bosses 28 on the module base 14.

The second or jacketed portion of the fiber is then removed by hand from the second winding section 52 at the top of the locked spool 40, until enough fiber is removed to connect to the ONT or other optical device at the premises. The free end of the jacketed fiber is terminated in an optical connector 64 (e.g., type SCA) that may be parked on the module base 14 for use by the installer if necessary. The connector 64 is then mated to a corresponding optical connector on the ONT, and the module cover 20 is closed over the module body 12 to complete the installation. Minor changes in the required length of the jacketed portion of the fiber can be accommodated by removing the module cover 20, and winding or unwinding the fiber in the second winding section 52 at the top of the spool 40.

Alternatively, if the ONT is provided with a □pigtail□ fiber, a short length of the jacketed portion of the fiber can be removed from the spool 40 and spliced to the fiber from the ONT. To accommodate such situations, the module base 14 may be formed with a narrow space beneath the parked optical connector 64 in which, e.g., two fusion splices can be stored in 45 mm long sleeves.

Figure 6:
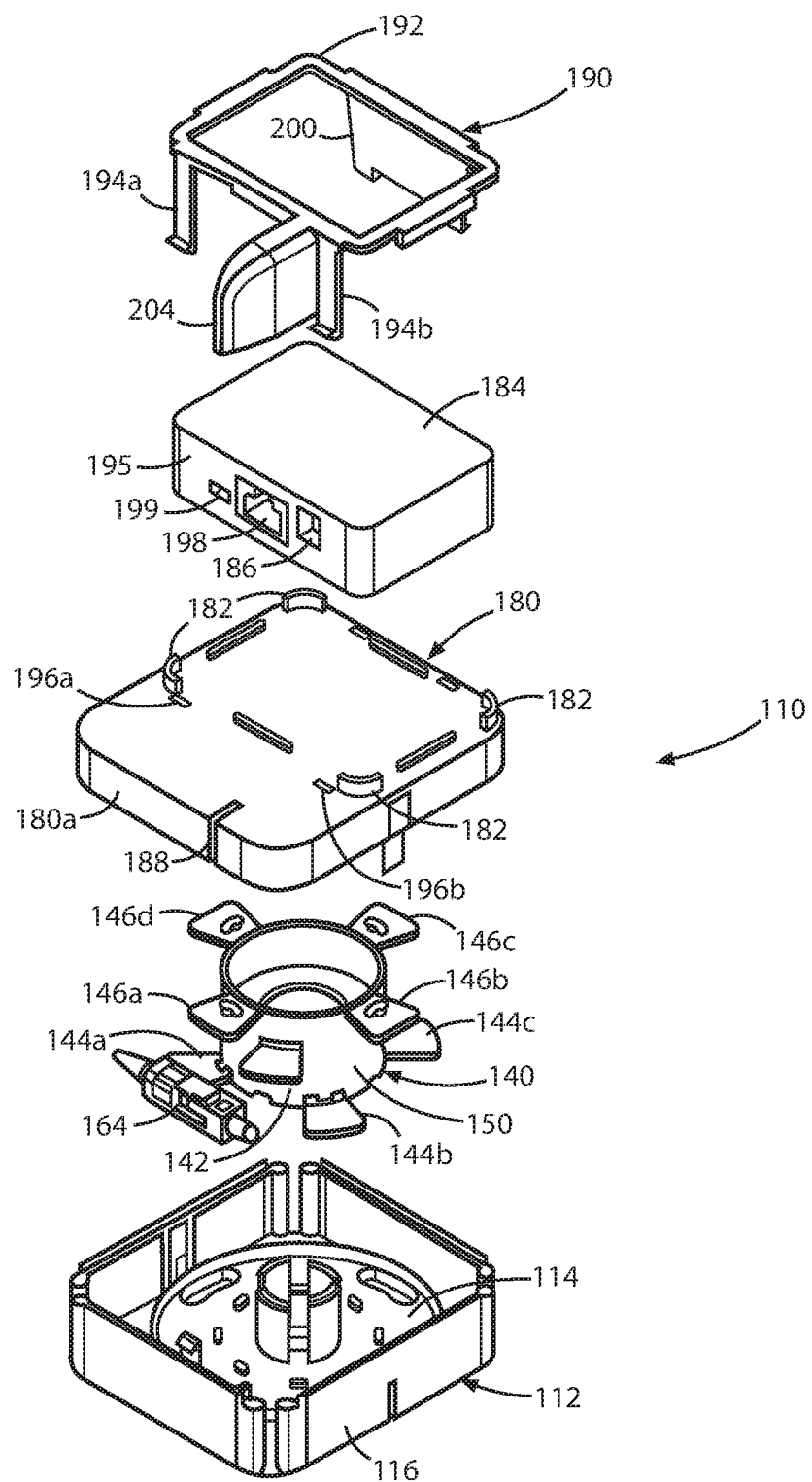
FIG. 6 is an exploded, isometric view of an optical fiber storage module according to a second embodiment of the invention.
Figure 7:
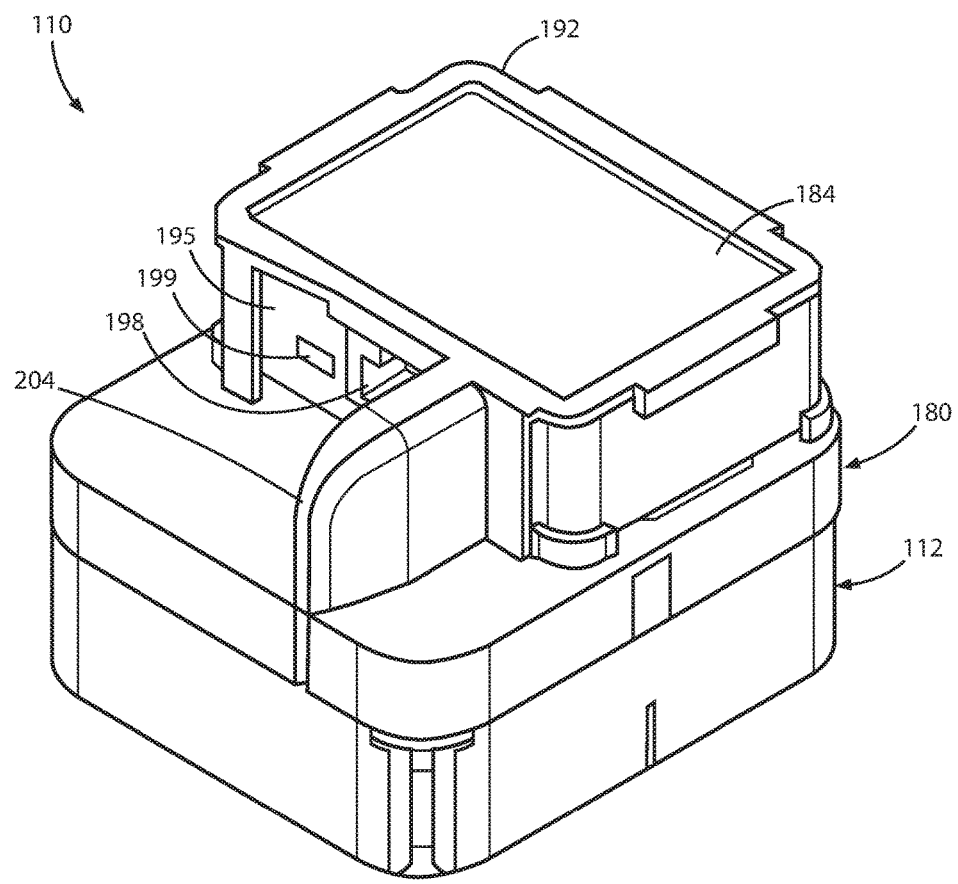
FIG. 7 is an isometric view of the module in FIG. 6 in a closed state, including an optical network terminal (ONT) mounted for operation atop a cover of the module.

FIGS. 6 and 7 show an optical fiber storage module 110 according to a second embodiment of the invention. Components of the module 110 that are the same or similar to those in the first embodiment of FIGS. 1 to 5 are identified using the same reference numerals increased by 100. The module 110 has a module body 112 including a base 114, and a wall 116 that extends upward from the outer perimeter of the base. The material, dimensions, and configuration of the module body 112 including the base 114 and the wall 116 may be identical to those of the module body 12 in the first embodiment of FIGS. 1 to 5.

Module 110 has a spool 140 which may also be identical to the spool 40 in the first embodiment, except the spool 140 lacks the third set of flat fiber retaining ears 48a to 48d provided on the spool 40. That is, the spool 140 has four flat fiber retaining ears 144a to 144d that extend radially outward in equi-angular spaced relation from the bottom of the spool hub 142, a second set of four flat fiber retaining ears 146a to 146d that extend radially outward in equi-angular relation from the top of the spool hub 142, and only one winding section 150 is defined between the first and the second sets of retaining ears. Also, the fiber that is wound on the spool 140 for routing at the premises may be entirely uniform, that is, the fiber may consist only of, e.g., an unjacketed 900 μm buffered fiber.

The module 110 includes a cover 180 which, as shown in FIG. 6, differs from the cover 20 of the module 10 by having a set of upstanding brackets 182 formed on its top surface, wherein the brackets 182 are configured and dimensioned to seat the base of a commercially available ONT 184. For example, the ONT 184 may be a model 8201 indoor dual mode single port ONT available from iPhotonix. After the fiber is unwound from the spool 140 and routed to the entry point at the premises, the spool 140 is locked from further rotation as in the first embodiment.

A short section of the fiber remaining on the spool 140 can then be removed by hand, terminated, and connected directly to a mating fiber connector 186 on the ONT 184 without any protective jacket on the fiber or the use of a separate jumper cable. The module cover 180 has a narrow slot 188 that opens through a side wall 180a and the top surface of the cover, so that the short section of fiber can be directed from the spool 140 inside the module 110 to the fiber connector 186 on the ONT 180 atop the module.

Once the ONT 184 is seated in the brackets 182 on the module cover 180 and the short section of fiber is connected to the ONT, a retainer 190 is lowered over the ONT in order to secure the ONT to the module cover 180. The retainer 190 has an open rectangular frame 192 formed and dimensioned to fit snugly about the perimeter of the ONT 184, and a pair of front legs 194a, 194b dimensioned to extend downward from the frame 192 at opposite sides of a front panel 195 on the ONT. The front legs 194a, 194b of the retainer 190 have feet that engage corresponding slots 196a, 196b in the top of the module cover 180. Except for the fiber connector 186 on the ONT, other components such as an Ethernet connector 198 and a power input jack 199 are left exposed on the front panel 195 of the ONT for use.

The ONT retainer 190 also has a rear flat wall 200 dimensioned to extend downward from the retainer frame 192 and to overlie a back wall of the ONT 184, and the retainer wall 200 has feet for engaging corresponding slots 202a, 202b atop the module cover 180. Moreover, the front of the retainer 190 has a forwardly projecting front hood 204. The hood 204 is formed and dimensioned to cover and protect the short section of fiber that passes through the slot 188 in the module cover 180, and which is terminated for connection at the front panel 195 of the ONT.

As disclosed herein, the inventive fiber storage modules 10 and 110 reduce the required number of components and the time needed to install an optical fiber at a user□s premises, thus lowering the cost of the installation to the user and the service provider. Adapters and fiber jumper cables previously needed for such installations are eliminated. Insertion losses or potential failures of the adapter, the jumper cable, and their associated connectors are likewise eliminated. The present invention therefore provides a fewest-component solution for FTTH and other fiber installations. The installation can be performed speedily, and the number of reliable optical connections that need to be made during the installation is reduced.

While the foregoing represents preferred embodiments of the present invention, it will be understood by persons skilled in the art that various changes, modifications, and additions can be made without departing from the spirit and scope of the invention, and that the invention includes all such changes, modifications, and additions that are within the scope of the following claims.

We claim:

1. A fiber optic storage module for installation at user premises, comprising:
   a module body including a base, and a wall extending upward from the base;
   the wall has one or more openings for paying out a length of an optical fiber from inside the module, so that the fiber can be routed between the module when installed at the user premises and a network terminal associated with the premises;
   one or more bosses formed on the base of the module body;
   a number of elongated retention fingers extending upward from the base, wherein at least one of the retention fingers has a first rim at a first height above the base, and at least one of the retention fingers has a second rim at a second height greater than the first height above the base;
   a fiber supply spool including a cylindrical hub, and an annular support disk fixed to an inner circumference of the hub;
   a cylindrical collar dimensioned and arranged for receiving the retention fingers extending from the module base and for mounting the supply spool on the retention fingers, wherein the collar is fixed at an inner circumference of the support disk inside the hub, and the inner circumference of the disk forms a third rim; and
   wherein the fiber supply spool is movable axially on the retention fingers between (a) a first position at which the third rim on the inner circumference of the annular support disk inside the spool hub is captured between the first rim on at least one of the retention fingers and the second rim on at least one of the retention fingers, so that the spool is free to rotate about the retention fingers when a fiber is unwound from the spool hub when the fiber is payed out through an opening in the wall of the module body, and (b) a second position at which a lower portion of the supply spool engages one or more bosses formed on the base of the module body so that the spool is locked from rotation about the retention fingers when the fiber is removed from the spool hub.

2. A fiber optic storage module according to claim 1, wherein the retention fingers extend in a circular array from the base of the module body, and the bosses are formed in a circular array coaxially about the array of retention fingers.

3. A fiber optic storage module according to claim 2, wherein the first and the second rims on the retention fingers project radially outward.

4. A fiber optic storage module according to claim 3, wherein the third rim on the inner circumference of the annular support disk projects radially inward.

5. A fiber optic storage module according to claim 1, including a cover having a bottom edge dimensioned and formed to align flush with a top edge of the module wall when the cover is at a closed position on the module body.

6. A fiber optic storage module according to claim 5, wherein the cover includes a pair of resilient locking tabs extending downward from opposite sides of the cover, and the locking tabs are dimensioned and formed to engage the inside surface of the module wall when the cover is at the closed position.

7. A fiber optic storage module for installation at user premises, comprising:
   a module body including a base, and a wall extending upward from the base;
   the wall has one or more openings for paying out a length of an optical fiber from inside the module, so that the fiber can be routed between the module when installed at the user premises and a network terminal associated with the premises;
   one or more bosses formed on the base of the module body;
   a number of elongated retention fingers extending upward from the base, wherein at least one of the retention fingers has a first rim at a first height above the base, and at least one of the retention fingers has a second rim at a second height greater than the first height above the base;
   a fiber supply spool including a cylindrical hub, an annular support disk fixed to an inner circumference of the hub, a first set of fiber retaining ears extending radially outward from a bottom end of the hub, a second set of fiber retaining ears extending radially outward from a top end of the hub, and a third set of retaining ears extending radially outward from the hub between the bottom end and the top end of the hub;
   the first and the third sets of fiber retaining ears form a first winding section on a lower portion of the spool hub, and the second and the third sets of retaining ears form a second winding section on an upper portion of the spool hub;
   a cylindrical collar dimensioned and arranged for receiving the retention fingers extending from the module base and for mounting the supply spool on the retention fingers, wherein the collar is fixed to the support disk inside the hub, and the inner circumference of the support disk forms a third rim;
   a continuous length of an optical fiber for routing at the user premises, wherein a first portion of the length of fiber is unjacketed and wound in the first winding section on the spool hub, and a second portion of the length of fiber is protectively jacketed and wound in the second winding section on the spool hub; and
   the fiber supply spool is movable axially over the retention fingers between (a) a first position at which the third rim on the inner circumference of the annular support disk inside the spool hub is captured between the first rim on at least one of the retention fingers and the second rim on at least one of the retention fingers, so that the spool is free to rotate about the retention fingers when the first portion of the length of fiber is unwound from the first winding section on the spool hub when the fiber is payed out through an opening in the wall of the module body, and (b) a second position at which a lower portion of the spool engages one or more bosses formed on the base of the module body so that the spool is locked from rotation about the retention fingers when the second portion of the length of fiber is removed from the second winding section on the spool hub.

8. A fiber optic storage module according to claim 7, wherein the retention fingers extend in a circular array from the base of the module body, and the bosses are formed in a circular array coaxially about the array of retention fingers.

9. A fiber optic storage module according to claim 8, wherein the first and the second rims on the retention fingers project radially outward.

10. A fiber optic storage module according to claim 9, wherein the third rim on the inner circumference of the annular support disk projects radially inward.

11. A fiber optic storage module according to claim 7, including a cover having a bottom edge dimensioned and formed to align flush with a top edge of the module wall when the cover is at a closed position on the module body.

12. A fiber optic storage module according to claim 11, wherein the cover includes a pair of resilient locking tabs extending downward from opposite sides of the cover, and the locking tabs are dimensioned and formed to engage the inside surface of the module wall when the cover is at the closed position.

13. A fiber optic storage module for installation at user premises, comprising:
   a module body including a base, and a wall extending upward from the base;
   the wall has one or more openings for paying out a length of an optical fiber from inside the module, so that the fiber can be routed between the module when installed at the user premises and a network terminal associated with the premises;
   one or more bosses formed on the base of the module body;
   a number of elongated retention fingers extending upward from the base, wherein at least one of the retention fingers has a first rim at a first height above the base, and at least one of the retention fingers has a second rim at a second height greater than the first height above the base;
   a fiber supply spool including a cylindrical hub, an annular support disk fixed to an inner circumference of the hub, a first set of fiber retaining ears extending radially outward from a bottom end of the hub, and a second set of fiber retaining ears extending radially outward from a top end of the hub;
   a cylindrical collar dimensioned and arranged for receiving the retention fingers extending from the module base and for mounting the supply spool on the retention fingers, wherein the collar is fixed to the support disk inside the hub, and the inner circumference of the support disk forms a third rim;
   a continuous length of an unjacketed optical fiber for routing at the user premises, wherein the length of fiber is wound on the hub of the supply spool between the first and the second sets of retaining ears; and
   the fiber supply spool is movable axially over the retention fingers between (a) a first position at which the third rim on the inner circumference of the annular support disk inside the spool hub is captured between the first rim on at least one of the retention fingers and the second rim on at least one of the retention fingers, so that the spool is free to rotate about the retention fingers when the length of fiber is unwound from the spool hub when the fiber is payed out through an opening in the wall of the module body, and (b) a second position at which a lower portion of the spool engages one or more bosses formed on the base of the module body so that the spool is locked from rotation about the retention fingers when the length of fiber is removed from the spool hub.

14. A fiber optic storage module according to claim 13, wherein the retention fingers extend in a circular array from the base of the module body, and the bosses are formed in a circular array coaxially about the array of retention fingers.

15. A fiber optic storage module according to claim 14, wherein the first and the second rims on the retention fingers project radially outward.

16. A fiber optic storage module according to claim 15, wherein the third rim on the inner circumference of the annular support disk projects radially inward.

17. A fiber optic storage module according to claim 13, including a cover having a bottom edge dimensioned and formed to align flush with a top edge of the module wall when the cover is at a closed position on the module body.

18. A fiber optic storage module according to claim 17, wherein the cover includes a pair of resilient locking tabs extending downward from opposite sides of the cover, and the locking tabs are dimensioned and formed to engage the inside surface of the module wall when the cover is at the closed position.

19. A fiber optic storage module according to claim 17, including a retainer constructed and arranged for protecting a short section of the fiber, and for securing an optical network terminal (ONT) atop the cover of the module for connection to the short section of the fiber when the supply spool is at the second position on the retention fingers, and the short section of the fiber is removed from the spool hub to connect to the ONT.

20. A fiber optic storage module according to claim 19, including an optical connector for terminating the short section of the fiber for connection to a mating connector on the ONT.

\* \* \* \* \*